March 22, 1938. R. I. MEADER 2,111,796
ATTACHMENT FOR FASTENING LICENSE PLATES AND THE LIKE
Filed May 9, 1936

INVENTOR.
Ralph I. Meader
BY Ramsey, Kent, Chisholm and Lutz
his ATTORNEYS

Patented Mar. 22, 1938

2,111,796

UNITED STATES PATENT OFFICE 2,111,796

ATTACHMENT FOR FASTENING LICENSE PLATES AND THE LIKE

Ralph I. Meader, Tampa, Fla.

Application May 9, 1936, Serial No. 78,917

5 Claims. (Cl. 40—125)

This invention relates to a device for use in attaching automobile license plates to the brackets which are ordinarily provided on automobiles; though the device is not limited to that particular use.

An object of the invention, as it relates particularly to its use in connection with automobile license plates, is to provide as a substitute for the conventional bolt-and-nut fastener, a bolt with which is associated a composite nut provided with means that permits the nut to be advanced on the bolt to the desired extent, but, under normal conditions of use, prevents relative movement of translation of the nut with respect to the bolt in the opposite direction. It is contemplated that the outer face of the nut will carry, preferably embossed thereon, some indicia, as, for instance, a seal whose presence is intended to certify to the genuineness of the license plate with which it is associated, and to the fact that the particular plate was issued for the particular car on which it is fastened. The composite nut is so constructed that if an attempt be made to pry it off from the nut it will be, so far as its completeness is concerned, substantially destroyed. The purpose of all this is to provide a fastening means for automobile license plates or the like which may be issued by the licensing authority at the same time as the plates are issued, such fastening means carrying a seal or the like and being not only non-removable by the ordinary operations of unscrewing, but being readily frangible if the more drastic method of prying up is attempted.

Other features, objects, and advantages of the invention will be apparent by reference to the following detailed description taken in conjunction with the accompanying drawing, wherein.

Figure 1:
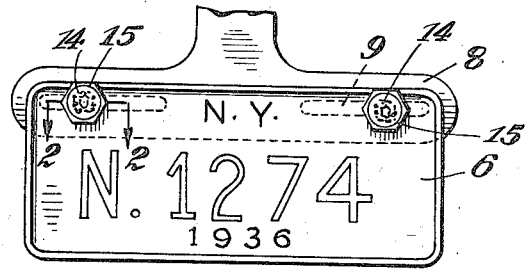
Fig. 1 is a view illustrating a license plate secured to the usual bracket by means embodying my invention.
Figure 5:
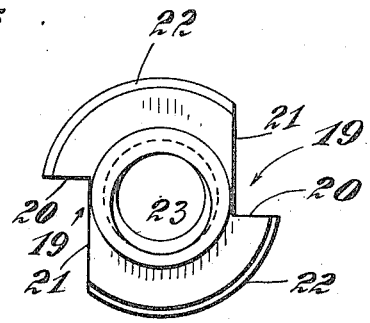
Fig. 5 is a top plan view of the bushing which forms part of the composite nut.
Figure 2:
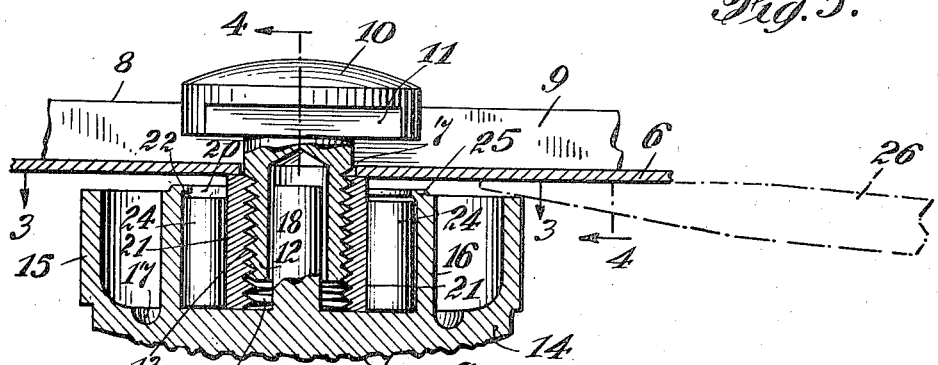
Fig. 2 is an enlarged sectional view taken on the line 2—2 of Fig. 1.
Figure 3:
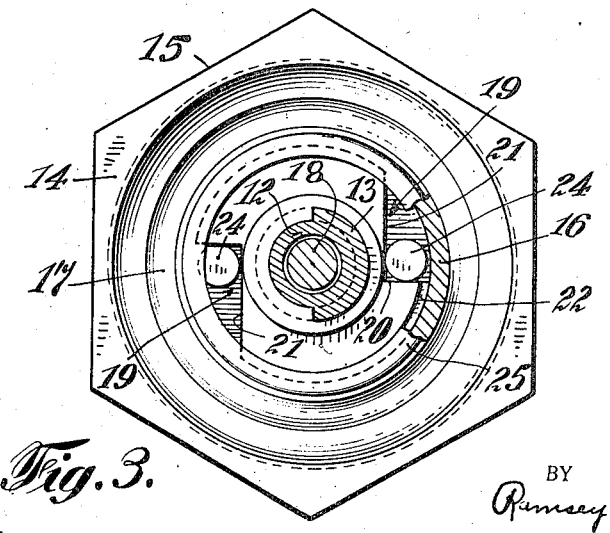
Fig. 3 is a view partly in section and partly in elevation taken on the line 3—3 of Fig. 2 looking in the direction of the arrows.
Figure 4:
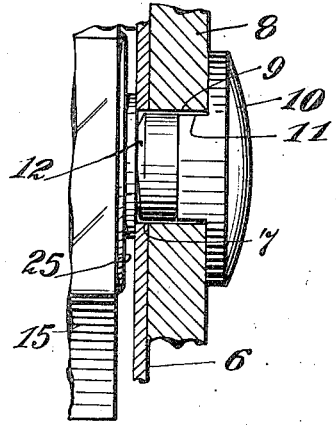
Fig. 4 is a view with parts in section and parts in elevation taken on the line 4—4 of Fig. 2.

Referring to the numerals on the drawing, there is shown at 6 a license plate, provided with the usual bolt holes 7. This plate 6 is to be attached to the flat face 8 of a bracket carried by the automobile, this flat face 8 being provided with longitudinal slots 9. In ordinary practice a bolt is inserted through each of the bolt holes 7 and slots 9 and a nut applied to the bolt at the other side of the bracket. According to my invention, however, there is employed a bolt 10, the underface of the head of which is cut away on opposite sides of the center as indicated at 11, to provide a lug with parallel straight sides that snugly fit in the slots 9 of the bracket, so that when the lug is in position in the slot the bolt is held against rotation. I prefer, for reasons hereinafter appearing, that the bolt shall have a hollow shank, indicated at 12, which shank is exteriorly threaded as at 13. Cooperating with the bolt is a composite nut comprising a shell 14, on the outer surface of which may be embossed or otherwise applied a seal or the like insignia or identifying indicia indicated at 14ª. This shell, which is preferably made of some readily frangible metal, and which may be a casting, may be provided with a rim 15 extending from the head, and an interior concentrically arranged annular wall or curbing 16 of substantially the same height as the rim 15. Preferably the head of the nut between the rim 15 and the curbing 16 is weakened as by means of an annular groove 17. Extending centrally from the head of the nut is a pin 18 which fits within the tubular shank 12 of the bolt, and surrounding the pin 18 so as to be rotatable in one direction of rotation around the pin and between the pin and the interior wall of the curbing 16 is the bushing shown in Fig. 5, this bushing being provided on opposite sides of its center with notches 19 running the full length of the bushing, each notch presenting a short surface 20 extending from the periphery of the bushing towards the center, and a longer surface 21 which is at right angles to the surface 20. The bushing is also provided with shoulders 22 at its upper end extending between the notches 19 and with a center through aperture 23. The bushing is inserted within the well formed by the curbing 16, the pin 18 of the nut passing through the bushing as shown in Fig. 2. Now a roller pin 24 is dropped into each of the spaces defined between notches 19 and the interior wall of the curbing 16, these rollers being of such size, diametrically speaking, and so related to the surfaces 20 and 21 and the inner wall of the curbing 16, that the bushing may be readily rotated in a contraclockwise direction without causing rotation of the shell 14, but will, by their wedging action, in a manner well understood, cause the bushing to rotate along with the shell when the latter is turned in a clockwise direction. In order to hold the bushing and pins in position and substantially prevent relative movement of translation between the nut on the one hand and the bushing and wedging rollers on the other hand, the upper end of the curbing 16 may be headed over as indicated at 25, the turned over edge portion of the curbing resting on the shoulder 22 of the bushing and extending well over the ends of pins 24, it being understood that as shown in Fig. 2 the rollers 24 have a length less than the distance between the bottom of the well defined by the curbing 16 and the shoulder 22 of the bushing. Preferably the shoulders 22 are wide enough so that the headed over portion of the curbing 16 may effectively overlie the pins 24, to guard against tampering, as will be obvious.

With the composite nut thus constituted and assembled, and assuming that a bolt 10 has been put in place, with the lug at the inner face of the bolt head engaged in the bracket slot so as to prevent rotation of the bolt, the nut is now applied to the threaded end of the bolt, the pin 18, which extends through the bushing, entering the tubular shank of the bolt progressively as the interior threaded wall 23 of the bushing advances spirally along the exteriorly threaded wall of the bolt shank, until the proper relation has been established between the nut and bolt and license plate and bracket, to hold the bracket securely in position; it being understood that in all these movements the nut has been rotated, for example, in a clockwise direction. The locking action takes place between the bolt and the bushing since the bushing extends beyond the face of the nut. With the parts so brought to position, if an attempt be made to rotate the nut contraclockwise, the shell 14 will merely rotate freely and will not move away from the license plate. If an attempt be made to remove the nut as by introducing a pry, indicated in Fig. 2 as the end of a screw driver 26 between the license plate and the edge of the rim 15, the result will be a fracture of the shell along the weakened line of the groove 17. The rim 15 has the exterior thereof shaped to provide wrench-engaging surfaces so that the composite nut can be tightened on the bolt sufficiently to lock a plate to a bracket as shown in the drawing. It will be observed that the device is weakened intermediate the portion having wrench-engaging surfaces and the portion engaging the bolt shank.

It is contemplated that the fastening means thus described will be dispensed only by the licensing authorities or properly accredited agents or representatives, so that a check may be had on the uses to which they are to be put.

Some of the objects of the invention may be attained if, instead of the arrangement described, I utilize a lock-nut to cooperate with a bolt, such lock-nut having the general form, exteriorly, of that shown in the drawing, but provided with means which when the nut is turned to plate-holding position on the bolt, cannot be (or can be only with very great difficulty) backed off.

I claim:

1. The combination with a bolt having an externally threaded shank, of a nut comprising a housing having an annular-walled recess in one face thereof, a bushing in said recess, the end of the recess wall being turned over said bushing to lock it against withdrawal from said recess, said bushing been provided with a threaded aperture to receive said shank, said bushing having surface portions conforming to the shape of said housing recess wall, and having oppositely disposed dihedral recesses extending longitudinally thereof, and rollers seated in said bushing recesses, said rollers being movable to permit relative rotation between said bushing and said housing in one direction and being movable to lock said bushing to said housing against relative rotation in the opposite direction.

2. The combination with a bolt having an externally threaded shank, of a nut comprising a housing having wrench-engaging surfaces and having concentric recesses in one face thereof separated by an annular wall, a bushing locked in the inner of said recesses against withdrawal therefrom and being provided with a threaded aperture to receive said shank, said bushing being freely rotatable in one direction relative to said housing, and means for locking said bushing to said housing against relative rotation in the other direction, said housing being weakened intermediate the wall having wrench-engaging surfaces and said annular wall to rupture upon the application of force to cause simultaneous rotation of the housing and bushing in the direction of normal free relative rotation.

3. The combination with a bolt having a hollow externally threaded shank, of a nut comprising a housing having a recess in one face thereof, a central pin in said recess, a bushing locked in said recess against withdrawal therefrom, said bushing having a central aperture fitting around said pin and having the wall of said aperture threaded to receive the shank of said bolt with said pin entering said hollow shank, said bushing being freely rotatable relative to said housing in one direction, and means automatically operable to lock said bushing to said housing against relative rotation in the opposite direction.

4. The combination with a bolt having threaded shank, of a nut comprising a housing having wrench-engaging surfaces and having concentric recesses in one face thereof separated by an annular wall, the opposite face of said housing being provided with distinguishing indicia, a bushing locked in the inner of said recesses against withdrawal therefrom, said bushing having a threaded aperture to receive said shank, said bushing being freely rotatable relative to the housing in one direction, and means automatically operable to lock said bushing to said housing against relative rotation in the opposite direction, said housing being weakened intermediate the outer portion having the wrench-engaging surfaces and said annular wall, whereby efforts to lock said bushing to said housing against relative rotation in the direction of normal free rotation will cause a rupture of the continuity of said distinguishing indicia.

5. The combination with a bracket having a longitudinal slot and a plate having an aperture to register with said slot, of means for locking said plate to said bracket, said means comprising a bolt having a threaded shank and having a portion to fit in said slot to hold the bolt against rotation relative to the bracket, and a nut comprising a housing having a recess in one face thereof, a bushing locked in said recess against withdrawal therefrom and having a part thereof extending beyond the recessed face of the housing, said bushing having a threaded aperture to receive the shank of said bolt, means automatically operable to lock said bushing to said housing whereby rotation of the housing in one direction causes a corresponding rotation of the bushing to advance the bushing on the bolt until the plate and bracket are locked together, said locking means being automatically operable to release said bushing and said housing whereby said housing is freely rotatable relative to the bushing in the opposite direction.

RALPH I. MEADER.